(No Model.)

J. D. DENNIS.
WAGON HANDLE AND SEAT SUPPORT.

No. 259,672. Patented June 20, 1882.

Witnesses.
S. N. Piper
E. B. Pratt

Inventor.
John D. Dennis.
by R. H. Eddy atty

UNITED STATES PATENT OFFICE.

JOHN D. DENNIS, OF LYNN, MASSACHUSETTS.

WAGON HANDLE AND SEAT SUPPORT.

SPECIFICATION forming part of Letters Patent No. 259,672, dated June 20, 1882.

Application filed April 3, 1882. (No model.)

*To all whom it may concern:*

Be it known that I, JOHN D. DENNIS, of Lynn, in the county of Essex, of the State of Massachusetts, have invented a new and useful Improvement in Wagon Handle and Seat Supporters; and I do hereby declare the same to be described in the following specification and represented in the accompanying drawings, of which—

Figure 1:
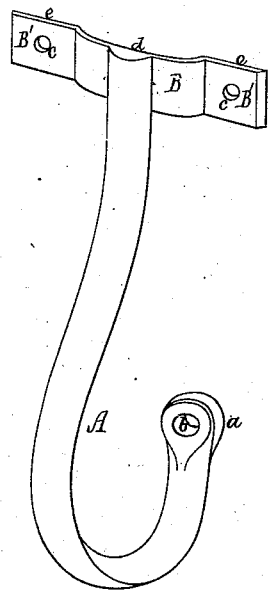
Figure 2:
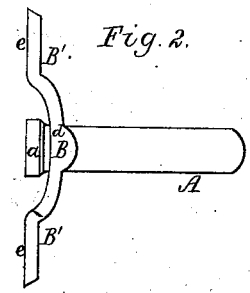
Figure 3:
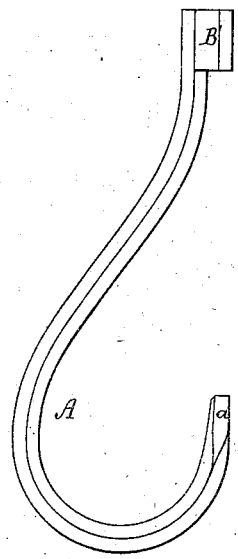
Figure 5:
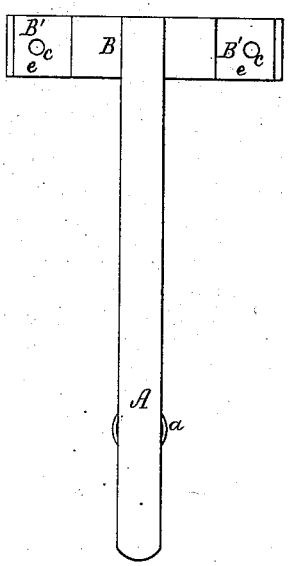
Figure 4:
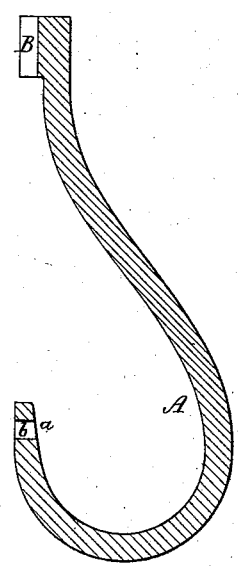

Figure 1 is a perspective view; Fig. 2, a top view; Fig. 3, a side elevation; Fig. 5, a front view; Fig. 4, a longitudinal section of a combined handle and seats upporter constituting my said invention.

In the said drawings, A denotes a handle in the form of a hook, and terminating at its lower end in a circular head, $a$, having a hole, $b$, made through it concentrically. At its upper end or part the hook or handle is inseparably connected with the wagon-seat supporter B, consisting of two arms, B' B', extending from it in opposite directions, and connected and formed or bent in manner as represented, each of the said arms having a hole, $c$, in it, near its outer end. The part $d$ of the seat-supporter, which is between the straight portions $e\ e$ thereof, is bowed or arched, as shown, in order that when the supporter and the handle are fastened by screws to the side of a wagon, with the top of the supporter flush, or about so, with the upper edge of such side, it, (the said supporter,) with the wagon-side, shall form a socket to receive a projection or tenon extending down from the wagon-seat.

From the above it will be seen that the supporter answers not only to aid in holding the wagon-seat in place, but as a means of sustaining the handle, which in turn serves to sustain the seat-supporter.

I claim—

As a new article of manufacture for application to the side of a wagon, the handle and seat supporter constructed and combined substantially as set forth.

JOHN D. DENNIS.

Witnesses:
   R. H. EDDY,
   E. B. PRATT.